United States Patent [19]

Tolliver

[11] Patent Number: 4,466,467
[45] Date of Patent: Aug. 21, 1984

[54] STACKABLE STIRRUP MAT

[76] Inventor: Wilbur E. Tolliver, 364 Hamilton Dr., Holland, Mich. 49423

[21] Appl. No.: 49,274

[22] Filed: Jun. 18, 1979

[51] Int. Cl.³ .............................................. F16L 55/00
[52] U.S. Cl. ....................................... 138/175; 245/2
[58] Field of Search ............... 138/175; 140/92.1, 107; 52/661, 662, 664, 669, 676; 139/386, 387 R, 425 R; 245/2

[56] References Cited

U.S. PATENT DOCUMENTS 3,840,054 10/1974 Tolliver ................................ 138/175
4,122,228 10/1978 Tolliver et al. .......................... 245/2

Primary Examiner—James E. Bryant, III
Attorney, Agent, or Firm—Price, Heneveld, Huizenga & Cooper

[57] ABSTRACT

A stirrup reinforcement mat in which the stirrup projections have a question mark configuration so that the extremity of the laterally extending top portion of each projection does not extend to any significant degree beyond the vertical plane defined by the base wire to which the stirrup projection is joined. This configuration is believed to enhance the strength of a concrete product reinforced with this mat and also minimizes tangling when the mats are stacked together for storage or shipping.

3 Claims, 5 Drawing Figures

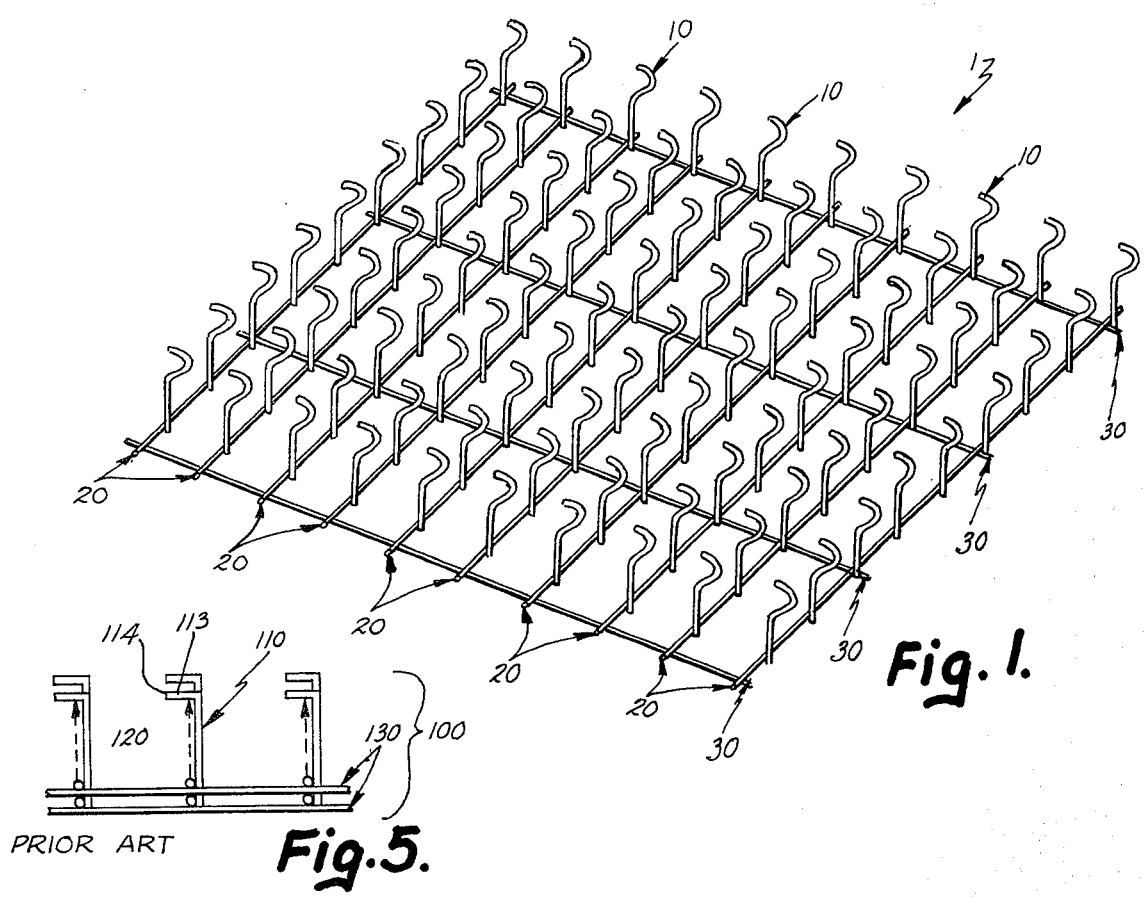
Fig. 1.
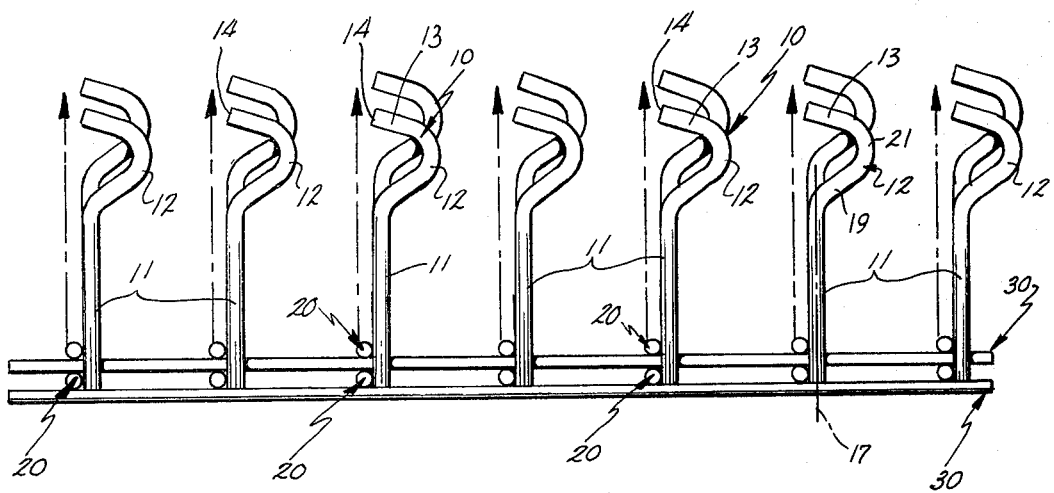
Fig.5. PRIOR ART
Fig.2.

STACKABLE STIRRUP MAT

BACKGROUND OF THE INVENTION

The present invention relates to stirrup reinforcement for concrete pipe or other concrete products. Stirrup reinforcement comprises a plurality of wire projections extending out of the plane of the base welded wire fabric reinforcement. In concrete pipe, for example, the generally cylindrical cage might have stirrup reinforcements projecting radially from the cage in the vicinity of the crown and invert reinforcing portions thereof.

For many years in the concrete pipe industry, it was common practice to weld or otherwise secure individual lengths of wire to the base fabric on the job site, after the fabric had been shaped into a cylindrical cage. Another alternative was to weld a continuous sinusoidal stand of wire to the cylindrical cage such that the nodes of the strand projected radially from the welded wire reinforcing cage.

I pioneered various types of mats which include a plurality of base wires joined by several tie wires lying generally in the same plane as the base wires, and a plurality of short lengths of wire which comprise projections welded to the base wires so as to project out of the plane of the base wires and tie wires. Such mats can readily be inserted into the pipe reinforcing cage or the like with the stirrup projections projecting through the spaces in the reinforcing cage.

The stirrup projections are often bent near the top thereof so that the top portions extend generally laterally from the generally vertical legs of the projections. An elevational view of a segment of two stacked stirrup mats hving such projection is shown in FIG. 5 of the drawings. The lateral tops give additional strength to the concrete product in which they are embedded, beyond the strength which would be obtained if the stirrup projections were merely straight.

Unfortunately, such stirrup projections cause shipping and handling problems. The lateral tops on the projections cause the mats to get tangled when one tries to separate a stack of them. The base wires of one mat tend to interfere with the lateral tops of the stirrup projections of the next lower mats when one tries to lift them off. This is illustrated by the phantom arrows in FIG. 5. Further, the height of the stack becomes limited due to this interference and one ends up with a plurality of separate stacks where it would be more desirable to have a single stack.

SUMMARY OF THE INVENTION

The present invention comprises a stirrup mat, method of using same and resulting product wherein each stirrup projection includes a projecting leg and a generally laterally extending top, but wherein the leg is so configured that the extremity of the laterally extending top does not project to any significant degree beyond the vertical plane generally defined by the base wire to which the stirrup projection is joined. As a result, the stirrup mats of the present invention can be continually stacked, in that the stacks are not limited by the height of the stirrup projections as in prior art mats. There is no tangling when one begins to separate the stirrup mats from their stack. Finally, we have surprisingly found evidence of increased strength in concrete pipe which is reinforced with stirrup mats made in accordance with the present invention.

These and many other features, objects and advantages of the present invention will be more fully understood and appreciated by reference to the written specification and appended drawings.

BRIEF DESCRIPTION OF THE DRAWINGS

FIG. 1 is a perspective view of a stirrup reinforcing mat made in accordance with the present invention;

FIG. 2 is an elevational view of two mats made in accordance with the present invention stacked one on top of the other;

FIG. 5 is a fragmentary view of two prior art stirrup mats stacked one on top of the other.

DESCRIPTION OF THE PREFERRED EMBODIMENT

Figure 3:
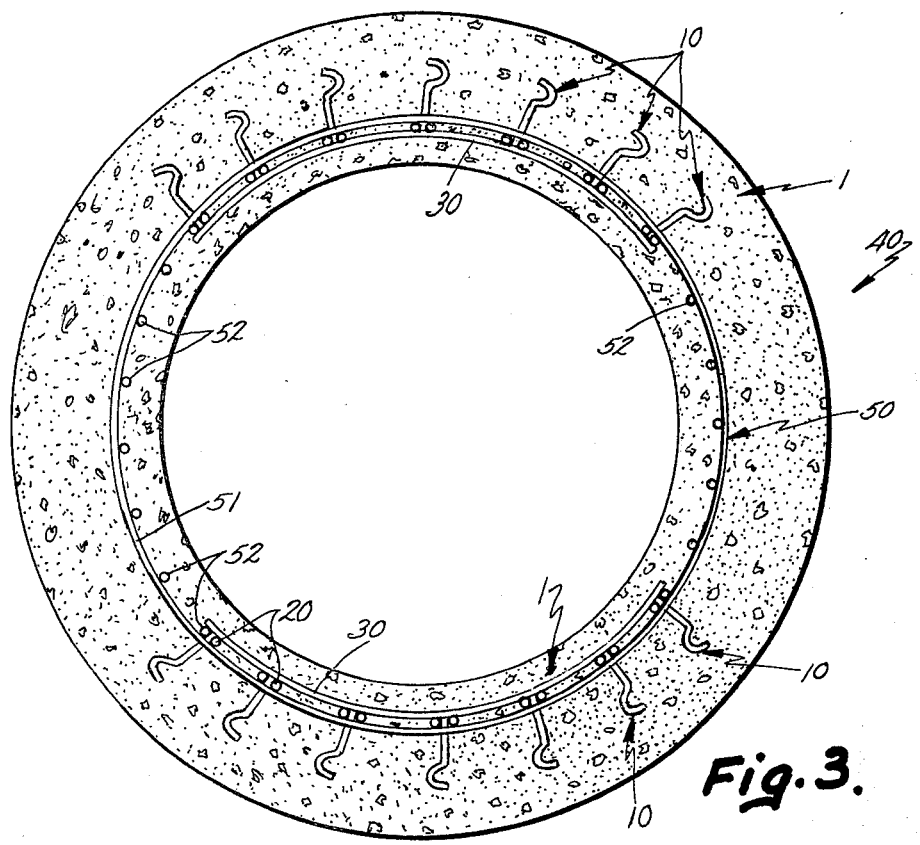
FIG. 3 is a cross sectional view of concrete pipe reinforced with a single reinforcing cage and with stirrup mats made in accordance with the present invention.

In the preferred embodiment, the mats 1 of the present invention include a plurality of stirrup projections 10 joined to a plurality of base wires 20. Base wires 20 are in turn joined together by several tie wires 30. The number of base wires 20 and tie wires 30 which one might provide will vary depending on job application. Similarly, whether one places the tie wires 30 on top of the base wires 20 or below the base wires 20 as shown may vary depending on job application. Tie wires 30 are shown beneath base wires 20 in these drawings primarily for illustrative purposes in that it makes cross sectional FIGS. 3 and 4 somewhat cleaner. If tie wires 30 were on top of base wires 20, they would be hidden from view in FIGS. 3 and 4.

The material of which base wires 20 and tie wires 30 are made may also vary depending on job application. In accordance with the teachings of my previous patent application Ser. No. 858,103 entitled MANUALLY FORMABLE STIRRUP MAT REINFORCEMENT, filed Dec. 7, 1977, and now U.S. Pat. No. 4,184,520 one might want to make tie wires 30 either slightly narrower in diameter than base wires 20 or of a more flexible or ductile material so that tie wires 30 would be sufficiently flexible that they can be manually deformed into the curvature of a cylindrical type reinforcing cage to which mat 1 might be joined.

Each stirrup projection 10 includes a generally vertical leg 11 (FIG. 2) which extends generally perpendicular to the plane defined by base wires 20 and tie wires 30. The term generally vertical is intended herein to include either intentional or accidental deviations to one side or the other of vertical since prior artisans sometimes intentionally slant stirrup projections one way or the other from truly vertical or one way or the other from truly radial when they are inserted into a cylindrical reinforcing cage.

The vertical leg 11 terminates in a question mark shaped deviation 12. Each question mark deviation 12 includes a generally laterally extending top portion or anchor 13. The term "generally laterally" is intended to include a fair bit of latitude and might easily in actual practice include deviations as great as 30° to 45° from being truly lateral or truly horizontal.

Each lateral top or anchor 13 terminates at an extremity 14 which preferably does not project to any significant degree beyond the generally vertical plane defined by the base wire 20 to which the particular projection 10 is joined. While some slight interference would be acceptable, it should not, for purposes of the present invention, be great. This dimensional relationship is illustrated by the phantom arrows in FIG. 2. Also, as shown in FIG. 2, leg 11 has a longitudinal axis 17. Anchor 13 has bottom portion 19 extending away from the longitudinal axis 17, an intermediate portion 21 extending generally parallel to axis 17 and the top portion 13 extends towards the axis 17.

This is in sharp contrast to the prior art mats 100 which are shown in stacked configuration in FIG. 5. There, the base wires 120, which are joined to tie wires 130 interfere with the lateral projections 113 of projection 110 when one tries to stack or unstack the mats. This is because the lateral extremities 114 of tops 113 extend far beyond the generally vertical plane defined by the base wires 120 to which each projection 110 is joined.

The particular wire and guage of wire out of which stirrup projections 10 are made will again vary depending on the job. Further, the number of projections 10 which are located along the length of a particular base wire 20 will vary depending on engineering considerations for a particular job.

Figure 4:
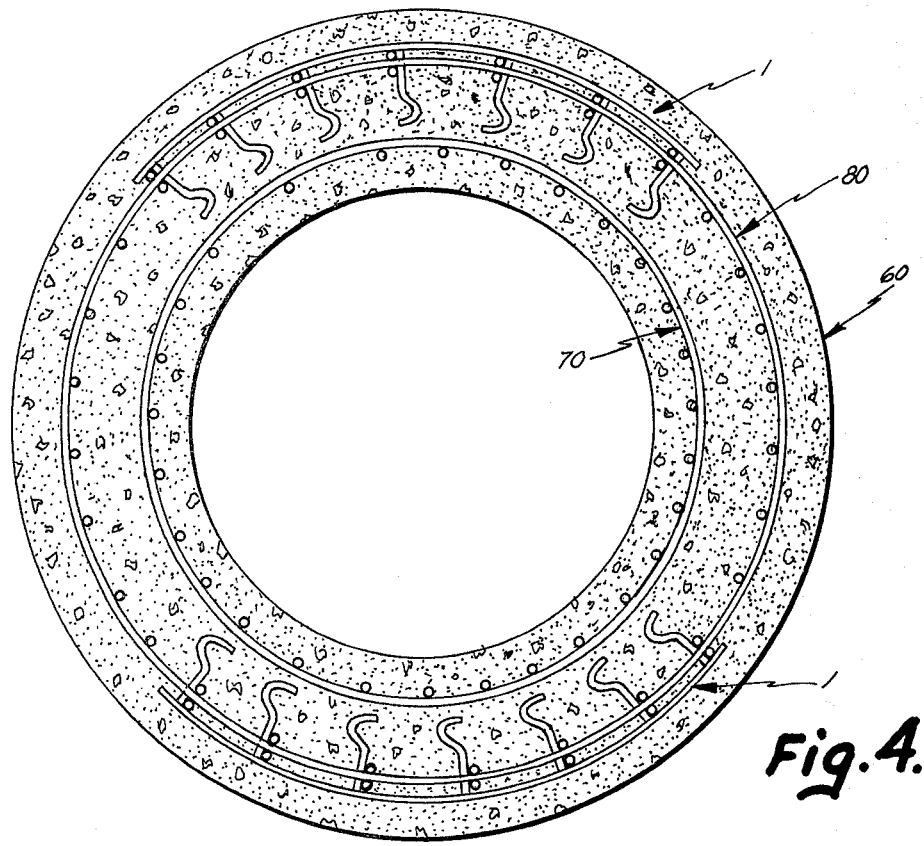
FIG. 4 is a cross sectional view of concrete pipe reinforced with two reinforcing cages and stirrup mats made in accordance with the present invention.

FIGS. 3 and 4 illustrate pipes 40 and 60 respectively made of concrete and reinforced with mats 1 made in accordance with the present invention. In the FIG. 3 illustration, the mats 1 are located on the inside of a cylindrical pipe reinforcing cage 50 with the individual stirrup projections 10 projecting generally radially through cage 50 towards the outside of pipe 40. As is conventional, cage 50 includes a plurality of circumferential wires 51 joined by a plurality of longitudinal wires 52. Whether longitudinals 52 are located on the inside or outside of circumferentials 51 is a matter of design choice. Locating them on the inside in the FIG. 3 was useful for illustrative purposes.

In FIG. 4, the pipe 60 is reinforced with both an inside cage 70 and an outside cage 80. Here, the stirrup mats 1 are located on the exterior of the outside cage 80 with the individual stirrup projections 10 projecting radially inwardly through outside cage 80 towards inside cage 70. This is desirable since it is somewhat easier to locate the mats 1 on the outside of a cage than trying to work them through from the inside of the inside cage.

Of course it is understood that the above is merely a preferred embodiment of the invention and that various changes and alterations can be made without departing from the spirit and broader aspects thereof as set forth in the claims appended hereto, interpreted in accordance with the prior art and the doctrine of equivalents.

The embodiments of the invention in which an exclusive property or privilege is claimed are defined as follows.

1. A stirrup mat for reinforcing concrete pipe or the like wherein each of a plurality of stirrup projections is joined to one of a plurality of base wires which in turn are joined to a plurality of tie wires such that the stirrup projections project out of the plane defined by the base wires and tie wires, wherein the improvement comprises: each said stirrup projection including a generally vertically extending leg having a longitudinal axis and a generally laterally extending anchor having a lateral extremity, said leg and said anchor being so configured that the lateral extremity of said anchor projects towards but does not project to any significant degree beyond a vertical plane passing through and extending along the base wire to which the stirrup projection is joined, each said projection has a generally question mark configuration including a bottom portion extending away from said longitudinal axis, an intermediate portion extending generally parallel to said longitudinal axis, and a top portion of the question mark comprising said laterally extending anchor of said projection and which top portion extends towards said longitudinal axis and said vertical plane, said question mark opening toward said vertical plane.

2. A concrete pipe having a generally cylindrical welded wire reinforcing cage embedded therein and including a stirrup mat joined to the cage at the crown reinforcing portion thereof and another at the invert reinforcing portion thereof, wherein said mats include a plurality of stirrup projections, each of said stirrup projections being joined to one of a plurality of base wires which in turn are joined to a plurality of tie wires such that the stirrup projections project out of the plane defined by the base wires and tie wires, the improvement in said pipe comprising: each of said stirrup projections of said mat including a generally vertically extending leg having a longitudinal axis and a generally laterally extending anchor having a lateral extremity extending towards a vertical plane within which said leg extends, said leg and said anchor being configured so that the lateral extremity of said anchor does not project to any significant degree beyond a vertical plane passing through and extending along the base wire to which the projection is joined, each said projection has a question mark configuration including a bottom portion extending away from said longitudinal axis, an intermediate portion extending generally parallel to said longitudinal axis, and a top of the question mark comprising said laterally extending anchor of said projection, which top portion extends towards said longitudinal axis and said vertical plane, and said question mark opening towards the vertical plane within which said leg extends.

3. The concrete pipe of claim 2 wherein there is an interior pipe reinforcing cage and an exterior pipe reinforcing cage and said mats are joined to the exterior of the exterior cage with said projections projecting generally radially through the exterior cage towards the interior cage.

* * * * *